United States Patent
Ferhanoglu et al.

(10) Patent No.: US 11,231,322 B2
(45) Date of Patent: Jan. 25, 2022

(54) HIGH RESOLUTION PRISM SPECTROMETER COMPRISING A DIFFUSER FILM

(71) Applicants: ISTANBUL TEKNIK UNIVERSITESI, Istanbul (TR); ISTANBUL MEDIPOL UNIVERSITESI, Istanbul (TR)

(72) Inventors: Onur Ferhanoglu, Istanbul (TR); Muhammed Fatih Toy, Istanbul (TR); Sakir Kaan Cetindag, Istanbul (TR); Fehmi Civitci, Portland, OR (US)

(*) Notice: Subject to any disclaimer, the term of this patent is extended or adjusted under 35 U.S.C. 154(b) by 0 days.

(21) Appl. No.: 17/260,358

(22) PCT Filed: Jul. 12, 2019

(86) PCT No.: PCT/TR2019/050571
§ 371 (c)(1),
(2) Date: Jan. 14, 2021

(87) PCT Pub. No.: WO2020/018059
PCT Pub. Date: Jan. 23, 2020

(65) Prior Publication Data
US 2021/0293621 A1    Sep. 23, 2021

(30) Foreign Application Priority Data
Jul. 16, 2018 (TR) .................... 2018/10123

(51) Int. Cl.
*G01J 3/28* (2006.01)
*G01J 3/02* (2006.01)
*G01J 3/14* (2006.01)

(52) U.S. Cl.
CPC ............ *G01J 3/28* (2013.01); *G01J 3/0208* (2013.01); *G01J 3/0218* (2013.01); *G01J 3/14* (2013.01)

(58) Field of Classification Search
CPC .... G01J 3/28; G01J 3/02; G01J 3/0208; G01J 3/0218; G01J 3/14; G01J 3/0205
See application file for complete search history.

(56) References Cited

U.S. PATENT DOCUMENTS

| | | | | |
|---|---|---|---|---|
| 2,948,890 A | * | 8/1960 | Barth | H03M 1/287 341/13 |
| 2007/0268536 A1 | * | 11/2007 | Holmes | G03H 1/0011 359/2 |
| 2008/0106732 A1 | * | 5/2008 | Brady | G01J 3/0229 356/310 |

FOREIGN PATENT DOCUMENTS

| | | |
|---|---|---|
| CN | 108152268 A | 6/2018 |
| JP | 2004101189 A | 9/2002 |
| TR | 2016/10489 | 7/2016 |
| WO | 2013188520 A2 | 12/2013 |

OTHER PUBLICATIONS

International Search Report for corresponding PCT/TR2019/050571, dated Jan. 23, 2020.
Written Opinion of the International Searching Authority for corresponding PCT/TR2019/050571, dated Jan. 23, 2020.

* cited by examiner

*Primary Examiner* — Abdullahi Nur
(74) *Attorney, Agent, or Firm* — Egbert, McDaniel & Swartz, PLLC

(57) ABSTRACT

A prism spectrometer having higher resolution and wider spectral width through the use of a speckle generating diffuser.

4 Claims, 3 Drawing Sheets

HIGH RESOLUTION PRISM SPECTROMETER COMPRISING A DIFFUSER FILM

TECHNICAL FIELD

Figure 1:
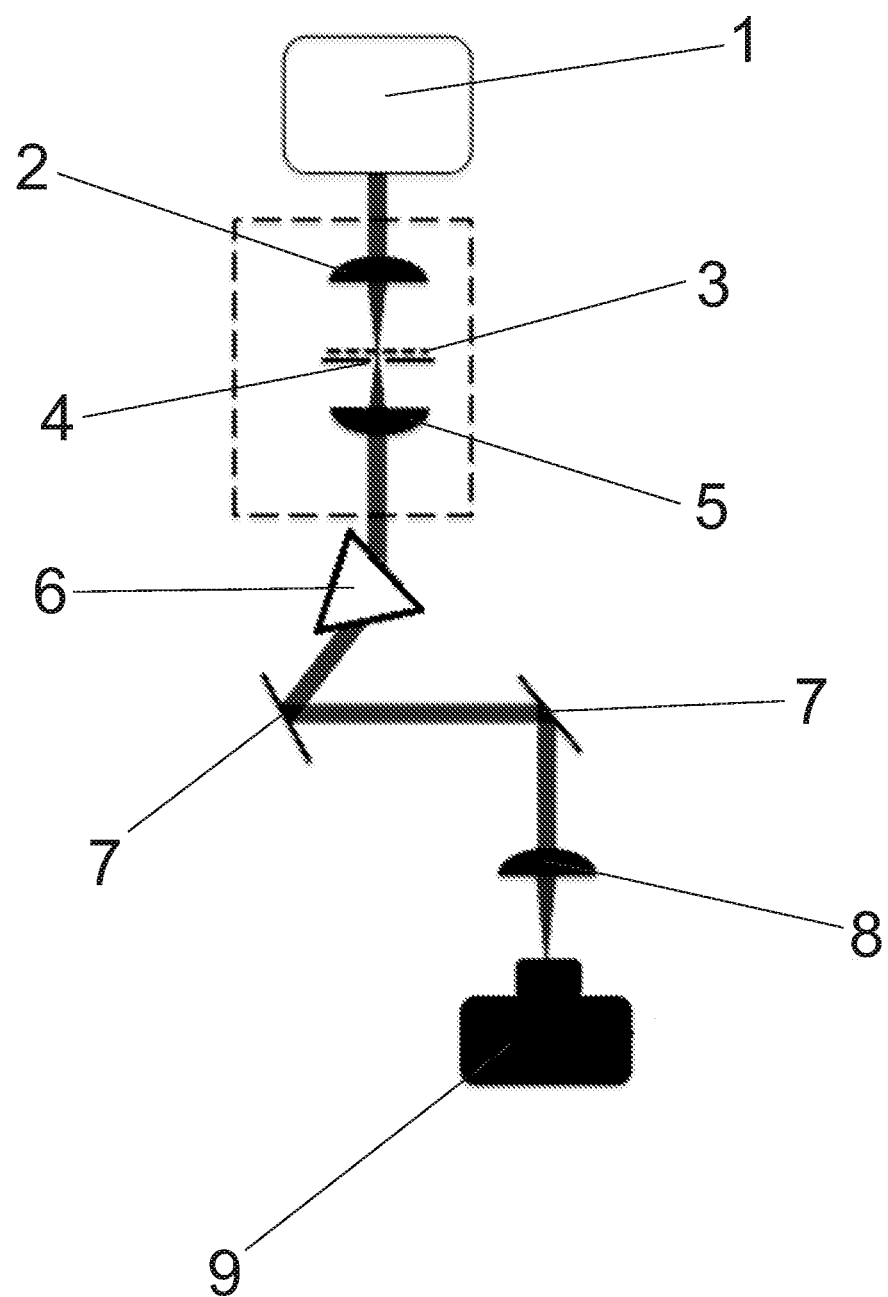

The invention is related to a prism spectrometer having improved resolution and wider spectral band-width by means of the speckle generating diffuser it comprises.

PRIOR ART

Spectrometers are devices that are used to determine chemical or physical characteristics of a sample by a spectroscopic analysis method and by measuring the properties of light in a certain section of an electromagnetic spectrum. Light that enters a spectrometer passes through a prism or a diffraction grating such that it is separated into its spectrum.

As the different wavelengths refract in angles with very small differences in prism spectrometers the resolution is not sufficient for practical applications. On the other hand prism spectrometers have an unlimited spectral bandwidth, theoretically.

Prism spectrometers typically provide wavelength resolution at 1 nanometre or similar values.

The diffraction grating spectrometers refract different wavelengths at different angles with a higher angle spread and have a better wavelength resolution in comparison to prism spectrometers. However the overlapping of different diffraction orders limit the measurable spectral bandwidth of such type of spectrometers. Moreover as the period of the diffraction grating can not be narrower than a certain value, its resolution is limited.

In the International patent document numbered WO2013188520A2 of the known state of the art, spectroscopy systems and methods which are based on the usage of a multimode optical fibre as a dispersive element in a spectrometer is disclosed. In this context multimode fibres have been used and the change of the mode interferences upon excitation wavelength change has been observed with a camera.

The usage of the prism and the diffuser film together in the related document is not disclosed at all.

In the known state of the art Japanese Patent document numbered JP2004101189A a method which is carried out to determine the image errors by sizing the length and depth of the surface error and by collectively measuring the surface of a large area to be examined is disclosed.

In the Turkish patent document numbered TR201610489 of the known state of the art a spectrometer which includes an optical spectral diffuser which refracts the light received spectrally, an enhanced optically adjustable refractor, which allows the refraction of the spectrally diffused light in an adjustable manner, and a series of detectors which receive the refracted light that has been diffused or adjusted spectrally is disclosed.

When the spectrometers of the known state of the art have been examined, a need for the development of prism spectrometer having higher resolution and wider band width by means of the diffuser film it comprises has risen.

Aims of the Invention

An aim of the invention is to provide a prism spectrometer comprising a speckle generating diffuser.

Another aim of this invention is to provide a prism spectrometer having higher resolution and wider wavelength band width by means of the speckle generating diffuser it comprises.

DETAILED DESCRIPTION OF THE INVENTION

The spectrometer provided in order to reach the aims of the invention has been illustrated in the figures.

FIG. 1: Schematic view of the spectrometer subject to the invention.

Figure 2:
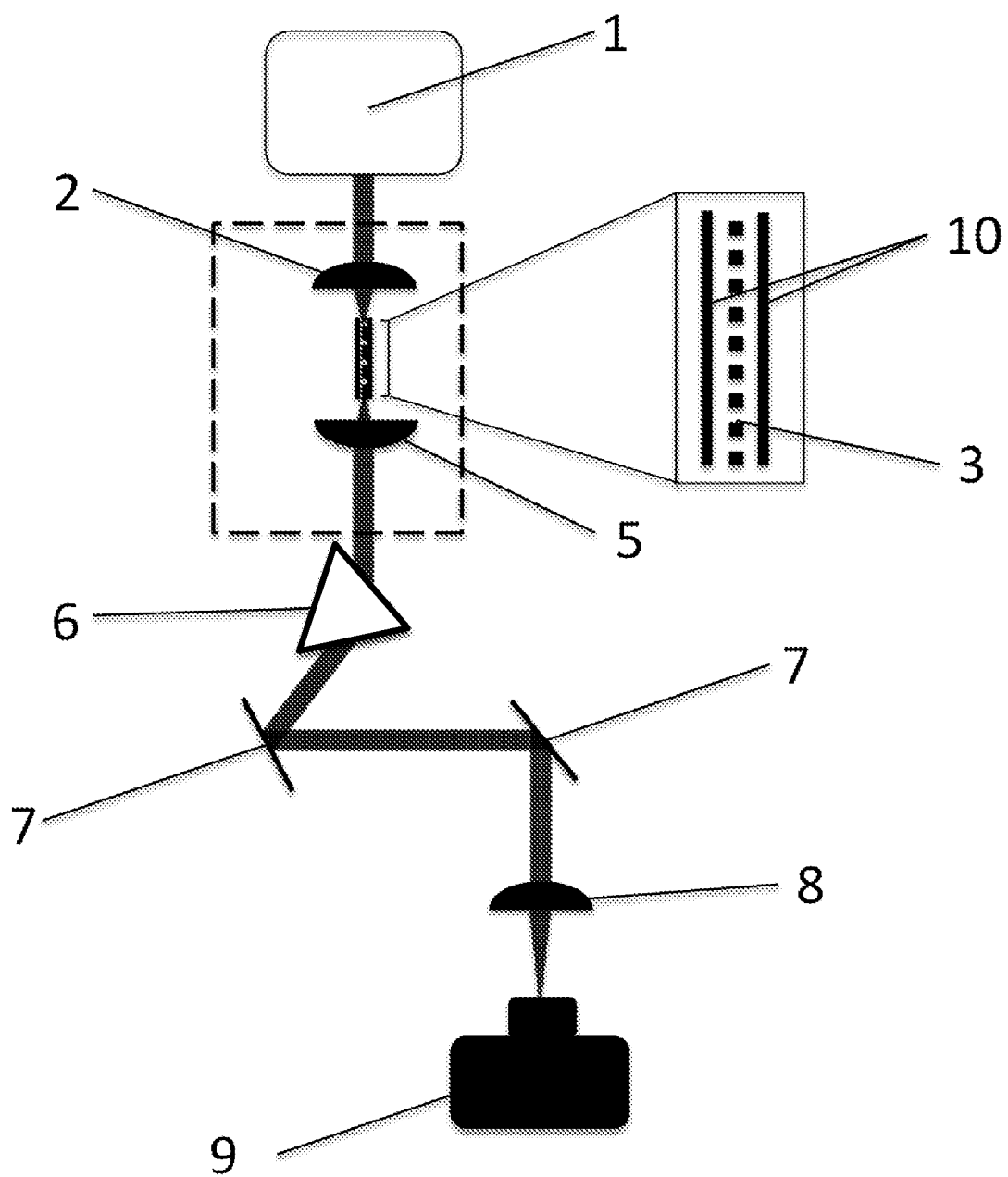

FIG. 2: Schematic view of the diffuser embedded waveguide in the type of a speckle generating waveguide based spectrometer subject to the invention.

Figure 3:
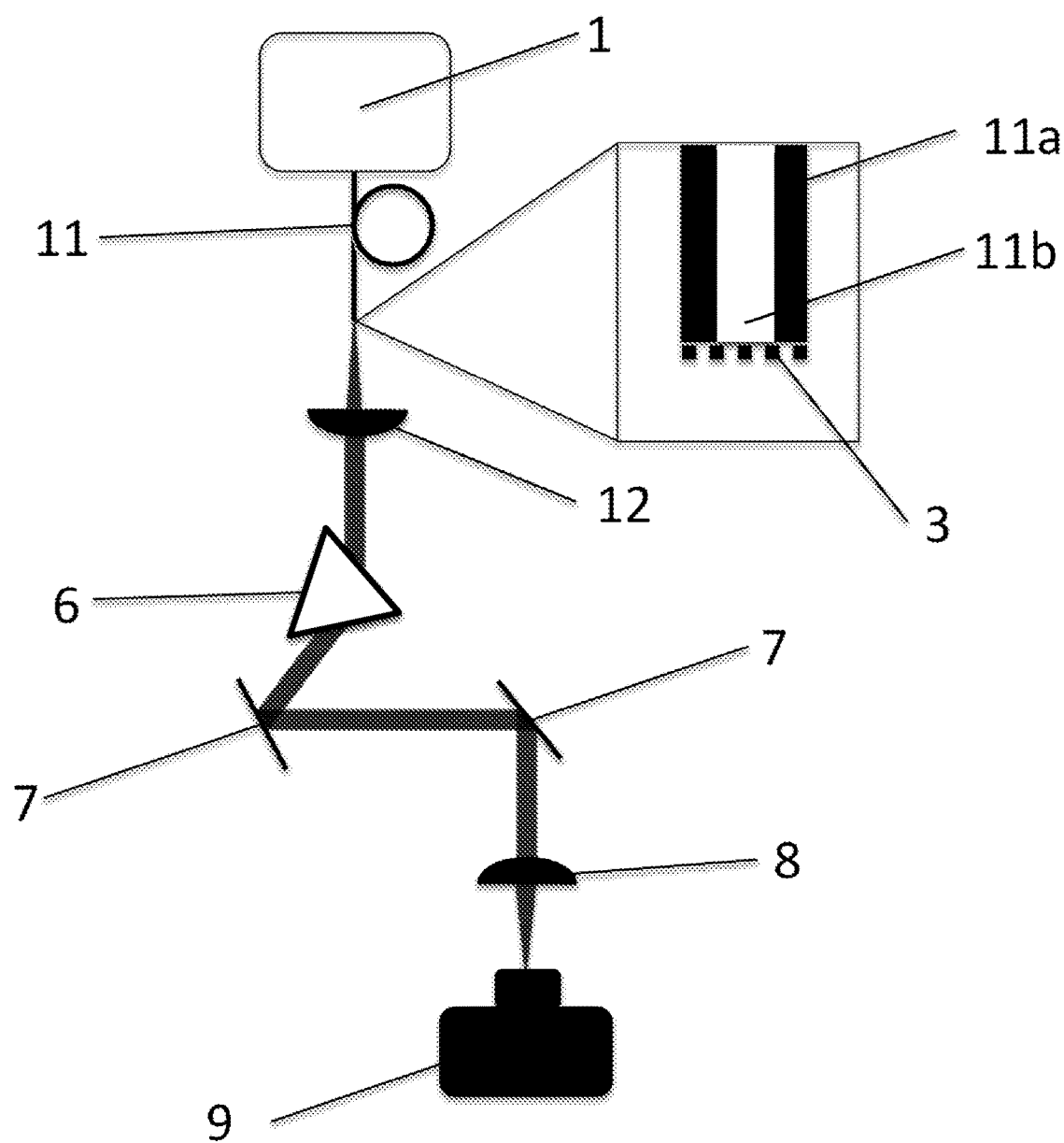

FIG. 3: Schematic view of the spectrometer subject to the invention, where the speckle generating diffuser is placed on the end facet of a single mode optical fiber.

The parts in the figures have each been numbered and their references have been listed below.

1. Light source
2. Cylindrical lens I
3. Diffuser film
4. Optical slit
5. Cylindrical lens II
6. Prism
7. Mirror
8. Cylindrical lens III
9. Camera
10. Metal or dielectric plates (waveguide)
11. Fibre optic cable
    11a. Fibre core
    11b. Fibre cladding
12. Collimating lens The spectrometer subject to the invention comprises;

A cylindrical lens I (2) into which the light received from the light source (1) enters, A diffuser film (3) which diffuses the light received from the cylindrical lens I (2) and which is located between the cylindrical lens I (2) and the optical slit (4).

Optical slit (4) which limits the scattering of the light diffused from the diffuser film (3), Cylindrical lens II (5) which collimates the light received through the optical slit (4), Prism (6) which diffracts the wavelengths of the light received from the cylindrical lens II (5) on a horizontal axis, Camera (9) which records speckle images or images of the wide band light source (1).

The diffuser film (3) used in the spectrometer subject to the invention forms a speckle pattern, which is dependent on the wavelength of the received light. The spatial locations of the speckled patterns on the camera (9) are also altered as the light passes through the prism (6) is directed to different locations based on wavelength.

When the wide spectral range comprising a plurality of wavelengths are examined prism (6) prevents the decrease in the speckle contrast due to overlapping of speckle patterns. In summary the high spectral resolution and wide spectral range which are simultaneously desired can be achieved by means of the prism (6) and diffuser film (3) suggested by the invention.

The speckle generating diffuser (3) can be a scattering structure placed perpendicular to the propagation direction of the light and it can also be a diffuser layer that acts as a waveguide that is sandwiched between the two parallel metal or dielectric plates (10). Through using a waveguide design the light beams that have been emitted from different directions from the diffuser layer and which have not reached the camera (9) can be reduced to a minimum and the optical efficiency of the system (the ratio of the light energy refracted onto the camera to the ratio of the light energy received from the light source) can be increased.

The diffuser film (3) can also be formed with a diffuser layer integrated directly on a fibre optic cable (11) where the light source (1) is matched instead of a cylindrical lens I (2), cylindrical lens II (5) and an optical slit (4) that are located in the spectrometer. By this means it is possible to eliminate the use of several optical elements in the system. The diffuser hardening or curing process (by oxygen contact, heat or by light) can be carried out following the submerging of the fibre optic cable directly into a scattering medium such as a hardening gel or glue mixed with scattering particles, thereby both the core (11a) and the cladding (1 lb) sections of the fibre tip can be coated with the scattering agent. Alternatively the scattering mixture can be hardened or cured with a different light source that is to coupled to the proximal end of the fibre and thereby the scattering agent can be guaranteed to stay only on the fibre core. In the case that the light at the fibre outlet is matched to the fibre optic cable a lens (12) which collimates the light should additionally be used.

The spectrometer subject to the invention may comprise of one or multiple mirror(s) (7) in order to adjust the direction of the light.

The spectrometer subject to the invention may comprise a cylindrical lens III (8) which enables the light reflected from the final mirror (7) to be focused onto the camera (9).

The speckle images collected from the camera (9) are first recorded for each individual wavelength by using a tuneable laser. Following this calibration process any kind of input light can be reconstructed as long as the wavelength of the input light is within the calibrated range.

Technically reconstruction is carried out by calculating the original vector and original values of the system by using the speckled images obtained during calibration.

By means of the spectrometer subject to the invention the resolution and spectral width trade-off encountered in prism and diffraction grating spectrometers can be solved without having to sacrifice any of them. The actual aspect of the spectrometer set forth by the invention is the combined usage of the diffuser film (3) and the prism (6) structure. The diffuser film (3) diffuses the light and establishes distinct speckle patterns specific to each wavelength and the change in these speckle patterns relative to the changes of very small wavelengths can be measured. By using the high sensitivity shown against the changes in wavelength by the speckled images, very high wavelength resolutions can be obtained. As the system set forth is constructed on the prism (6) spectrometer structure, (due to the usage of a prism), the total spectral bandwidth of the system (compared to diffraction grating spectrometers) is wider.

In the spectrometer subject to the invention, by means of the combined usage of the prism (6) and the diffuser film (3) the measurable spectral width can be very wide and higher resolutions can be obtained.

Moreover, by means of the prism (6) used in the spectrometer subject to the invention, when the wide spectral range comprising a plurality of wavelengths are examined prism (6) prevents the decrease in the speckle contrast due to overlapping of speckle patterns.

Due to the speckle patterns that are sensitive to the wavelength of the input light enters into the spectrometer subject to the invention, it has been observed through tests that the wavelength resolution that can be obtained by the spectrometer are 100 times better than a typical prism spectrometer and 20 times better than a typical diffraction grating spectrometer.

The invention claimed is:

1. A spectrometer comprising:
   a first cylindrical lens adapted to receive light from a light source;
   a diffuser film adapted to diffuse light received from said first cylindrical lens so as to create a spectrally varying spatial pattern;
   an optical slit that limits a scattering of the light diffused from said diffuser film;
   a second cylindrical lens that collimates light received through said optical slit, said diffuser film positioned between said first cylindrical lens and said second cylindrical lens; and
   a prism that separates wavelengths of light received from said second cylindrical lens on a horizontal axis.

2. The spectrometer of claim 1, further comprising:
   a camera that records a speckled image from the light source.

3. The spectrometer of claim 1, wherein said diffuser film is a diffuser layer sandwiched between two parallel metal or dielectric plates.

4. The spectrometer of claim 1, wherein said diffuser film is cured directly on a fiberoptic cable, the light source being coupled into the fiberoptic cable and collimated by a lens.

* * * * *